(12) United States Patent
Wang et al.

(10) Patent No.: US 11,976,158 B2
(45) Date of Patent: May 7, 2024

(54) NON-IONIC WATER BASED POLYURETHANE AND PREPARATION METHOD AND USE THEREOF

(71) Applicant: QIHE LEAHOU CHEMICAL CO., LTD., Shandong (CN)

(72) Inventors: Shunping Wang, Shandong (CN); Lianxiang Feng, Shandong (CN); Ruiqing Bai, Shandong (CN)

(73) Assignee: QIHE LEAHOU CHEMICAL CO., LTD., Shandong (CN)

( * ) Notice: Subject to any disclaimer, the term of this patent is extended or adjusted under 35 U.S.C. 154(b) by 664 days.

(21) Appl. No.: 17/252,574

(22) PCT Filed: Apr. 8, 2020

(86) PCT No.: PCT/CN2020/083745
§ 371 (c)(1),
(2) Date: Dec. 15, 2020

(87) PCT Pub. No.: WO2021/103376
PCT Pub. Date: Jun. 3, 2021

(65) Prior Publication Data
US 2021/0363285 A1    Nov. 25, 2021

(30) Foreign Application Priority Data

Nov. 26, 2019  (CN) .......................... 201911172395.2

(51) Int. Cl.
| C09D 175/00 | (2006.01) |
| C08G 18/22 | (2006.01) |
| C08G 18/40 | (2006.01) |
| C08G 18/42 | (2006.01) |
| C08G 18/48 | (2006.01) |
| C08G 18/75 | (2006.01) |
| C09D 175/04 | (2006.01) |
| C09D 175/06 | (2006.01) |
| C09D 175/08 | (2006.01) |

(52) U.S. Cl.
CPC ......... *C08G 18/755* (2013.01); *C08G 18/222* (2013.01); *C08G 18/4018* (2013.01); *C08G 18/4277* (2013.01); *C08G 18/4825* (2013.01); *C09D 175/04* (2013.01); *C09D 175/06* (2013.01); *C09D 175/08* (2013.01)

(58) Field of Classification Search
CPC .. C09D 175/04; C09D 175/06; C09D 175/08; C08G 18/222; C08G 18/755; C08G 18/4018; C08G 18/4277; C08G 18/4825
See application file for complete search history.

(56) References Cited

U.S. PATENT DOCUMENTS

| 2006/0183848 | A1 | 8/2006 | Maier et al. |
| 2008/0236449 | A1 | 10/2008 | Yang et al. |
| 2013/0203936 | A1* | 8/2013 | Fujita ................. C08G 18/3885 524/591 |

FOREIGN PATENT DOCUMENTS

| CN | 102432992 A | 5/2012 |
| CN | 104193941 A | 12/2014 |
| CN | 104497260 A | 4/2015 |
| CN | 107903358 A | 4/2018 |

OTHER PUBLICATIONS

"International Search Report and Written Opinion Issued in PCT Application No. PCT/CN2020/083745", dated Aug. 26, 2020, 8 Pages.

* cited by examiner

*Primary Examiner* — Michael L Leonard
(74) *Attorney, Agent, or Firm* — Holzer Patel Drennan

(57) ABSTRACT

The disclosure provides a non-ionic water based polyurethane, which is prepared from the following components in parts by weight: 120-185 parts of polymeric polyol, 30-40 parts of diisocyanate, 0.3-0.6 parts of antioxidant, 0.1-0.5 parts of organometallic catalyst, 1-3 parts of intramolecular crosslinking agent, 4-6 parts of silicone oil, 2.1-5.5 parts of auxiliary, 1-2 parts of chain extender, and 600-750 parts of water, where the polymeric polyol includes a polyether diol and a polyester diol, and the auxiliary includes a wetting agent, a leveling agent and a defoamer. The non-ionic water based polyurethane provided by the disclosure has excellent water resistance, mechanical properties and compatibility. Moreover, no organic solvent is added, thus, the disclosure results in no secondary pollution, and ensures environmental protection.

12 Claims, No Drawings

NON-IONIC WATER BASED POLYURETHANE AND PREPARATION METHOD AND USE THEREOF

The present application claims priority to Chinese Patent Application No. 201911172395.2 filed with the China National Intellectual Property Administration (CNIPA) on Nov. 26, 2019 and entitled "NON-IONIC WATER BASED POLYURETHANE AND PREPARATION METHOD AND USE THEREOF", which is incorporated herein by reference in its entirety.

TECHNICAL FIELD

The disclosure belongs to the technical field of polyurethane, and relates to a non-ionic water based polyurethane and a preparation method and use thereof.

BACKGROUND

Water based polyurethane, with water as a solvent, has many advantages, such as safety, reliability, excellent mechanical properties, and easy modification. It has gradually replaced solvent-thinned polyurethane and represents an important direction for development of polyurethane industry. The water based polyurethane can be widely used in many fields such as paints, adhesives, fabric coatings, fabric finishing agents, leather finishing agents, paper surface treating agents and fiber surface treating agents.

The water based polyurethane can be divided into three groups based on charge of a hydrophilic group: anionic, cationic and non-ionic water based polyurethanes. A non-ionic polyurethane coating film has desired acid and dielectric resistance and excellent biocompatibility, and thus has a great potential in many applications such as leather finishing agents. However, the existing non-ionic water based polyurethane completely relies on action of an internal hydrophilic group at an emulsification stage, and has poorer water resistance compared with the anionic polyurethane, which limits applications thereof. Moreover, during synthesis of the existing non-ionic water based polyurethane, in order to improve dispersion performance of the polyurethane and meet requirements for its use, it is usually necessary to add a small amount of organic solvent such as ketones. However, the added organic solvent will volatilize into the air as gaseous molecules during use, which not only causes environmental pollution, but also poses a threat to human health.

SUMMARY

In order to solve the problems in the prior art, the disclosure provides a non-ionic water based polyurethane and a preparation method and use thereof. The non-ionic water based polyurethane provided by the disclosure has excellent water resistance, mechanical properties and compatibility. Moreover, no organic solvent is added, thus, the disclosure is environmentally friendly.

The disclosure provides a non-ionic water based polyurethane, which is prepared from the following components in parts by weight:
120-185 parts of polymeric polyol,
30-40 parts of diisocyanate,
0.3-0.6 parts of antioxidant,
0.1-0.5 parts of organometallic catalyst,
1-3 parts of intramolecular crosslinking agent,
4-6 parts of silicone oil,
2.1-5.5 parts of auxiliary,
1-2 parts of chain extender, and
600-750 parts of water,
where the polymeric polyol includes a polyether diol and a polyester diol, and
the auxiliary includes a wetting agent, a leveling agent and a defoamer.

Preferably, the polyether diol includes at least two of polyethylene glycol, polyoxypropylene glycol, polytetrahydrofuran ether glycol, ethylene oxide polyether, non-ionic diol, linear polyethylene glycol bifunctional methyl ether and polyethylene glycol monomethyl ether; and the polyester diol includes at least one of carbonate diol, polycaprolactone diol and polybutylene adipate.

Preferably, a mass ratio of the polyether diol to the polyester diol is (110-155):(10-30).

Preferably, the diisocyanate includes at least one of isophorone diisocyanate, hydrogenated phenylmethane diisocyanate and hexamethylene diisocyanate.

Preferably, the silicone oil includes hydroxyl-containing silicone oil and/or amino-containing silicone oil.

Preferably, the antioxidant includes hindered phenolic antioxidant and/or phosphite antioxidant;

the organometallic catalyst includes at least one of organic silver catalyst, organic bismuth catalyst, and organic zinc catalyst;

the intramolecular crosslinking agent includes trimethylolpropane and/or trimethylolethane; and the chain extender includes at least one of ethylene diamine, hydroxyethyl ethylene diamine and isophorone diamine.

Preferably, a mass ratio of the wetting agent, the leveling agent and the defoamer is (1-3):(1-2):(0.1-0.5).

The disclosure further provides a method for preparing the above non-ionic water based polyurethane, including the following steps:

mixing the polymeric polyol, the antioxidant, the diisocyanate and the organometallic catalyst, and carrying out a first polymerization to obtain a first prepolymer;

mixing the first prepolymer and the intramolecular crosslinking agent, and carrying out a crosslinking reaction to obtain a second prepolymer;

mixing the second prepolymer and the silicone oil, and carrying out a second polymerization to obtain a third prepolymer; and mixing the third prepolymer, the auxiliary, the chain extender and the water, and carrying out a chain extension reaction to obtain the non-ionic water based polyurethane;

where the auxiliary includes a wetting agent, a leveling agent and a defoamer.

Preferably, the first polymerization is carried out at 60-75° C. for 0.5-0.6 h;

the crosslinking reaction is carried out at 75-85° C. for 1.0-1.5 h;

the second polymerization is carried out at 85-90° C. for 1.5-2.0 h; and the chain extension reaction is carried out at 10-20° C. for 0.5-1.0 h.

The disclosure further provides use of the above non-ionic water based polyurethane or a non-ionic water based polyurethane prepared by the above method in leather finishing agent, glass fiber and textile auxiliary.

The disclosure provides a non-ionic water based polyurethane, which is prepared from the following components in parts by weight: 120-185 parts of polymeric polyol, 30-40 parts of diisocyanate, 0.3-0.6 parts of antioxidant, 0.1-0.5 parts of organometallic catalyst, 1-3 parts of intramolecular crosslinking agent, 4-6 parts of silicone oil, 2.1-5.5 parts of auxiliary, 1-2 parts of chain extender, and 600-750 parts of water, where the polymeric polyol includes a polyether diol and a polyester diol, and the auxiliary includes a wetting agent, a leveling agent and a defoamer. The non-ionic water based polyurethane provided by the disclosure is obtained by the polymeric polyol and the diisocyanate as main components, the silicone oil as a functional monomer, the wetting agent, the leveling agent and the defoamer in the presence of the antioxidant, the organometallic catalyst, the intramolecular crosslinking agent and the chain extender. The obtained non-ionic water based polyurethane has excellent water resistance, mechanical properties and compatibility. No organic solvent is added and no secondary pollution is produced, thus, the disclosure is environmentally friendly.

The disclosure provides a method for preparing the non-ionic water based polyurethane, which has simple operations and is suitable for large-scale production.

DETAILED DESCRIPTION

The disclosure provides a non-ionic water based polyurethane, which is prepared from the following components in parts by weight:

120-185 parts of polymeric polyol,
30-40 parts of diisocyanate,
0.3-0.6 parts of antioxidant,
0.1-0.5 parts of organometallic catalyst,
1-3 parts of intramolecular crosslinking agent,
4-6 parts of silicone oil,
2.1-5.5 parts of auxiliary,
1-2 parts of chain extender, and
600-750 parts of water,
where the polymeric polyol includes a polyether diol and a polyester diol, and
the auxiliary includes a wetting agent, a leveling agent and a defoamer.

In the disclosure, all raw material components are commercially available products well known to those skilled in the art unless otherwise specified.

In the disclosure, based on parts by weight, raw materials for preparation of the non-ionic water based polyurethane include 120-185 parts, preferably 125-170 parts, more preferably 130-160 parts, most preferably 135-150 parts of polymeric polyol. In the disclosure, number average molecular weight of the polymeric polyol is preferably 1,900-2,100, and more preferably 2,000. In the disclosure, the polymeric polyol includes a polyether diol and a polyester diol. The polyether diol preferably includes at least one of polyethylene glycol, polyoxypropylene glycol, polytetrahydrofuran ether glycol, ethylene oxide polyether, non-ionic diol, linear polyethylene glycol bifunctional methyl ether and polyethylene glycol monomethyl ether. More preferably, the polyether diol includes at least one of polyethylene glycol, polyoxypropylene glycol, polytetrahydrofuran ether glycol, ethylene oxide polyether and non-ionic diol, and at least one of linear polyethylene glycol bifunctional methyl ether and polyethylene glycol monomethyl ether. The disclosure has no specific limitation on a mass ratio of different types of polyether diols, and any ratio can be used. In the disclosure, the non-ionic diol is preferably Ymer N120 (Shanghai Jide Chemical Co., Ltd.), and the linear polyethylene glycol bifunctional methyl ether is preferably Perstorp N120.

In the disclosure, the polyester diol preferably includes at least one of carbonate diol, polycaprolactone diol and polybutylene adipate. More preferably, the polyester diol includes carbonate diol, polycaprolactone diol or polybutylene adipate.

In the disclosure, a mass ratio of the polyether diol to the polyester diol is preferably (110-155):(10-30), more preferably (115-145):(15-30), most preferably (120-135):(15-25). The disclosure adopts the above two polymeric polyols which have excellent low temperature flexibility, weather and water resistance, mechanical properties and thermal stability, and the like, thereby improving water resistance, mechanical properties and compatibility of the non-ionic water based polyurethane.

In the disclosure, based on the polymeric polyol in parts by weight, the raw materials for preparation of the non-ionic water based polyurethane include 30-40 parts, preferably 32-40 parts, more preferably 35-40 parts of diisocyanate. In the disclosure, the diisocyanate preferably includes at least one of isophorone diisocyanate, hydrogenated phenylmethane diisocyanate and hexamethylene diisocyanate. More preferably, the diisocyanate includes isophorone diisocyanate, hydrogenated phenylmethane diisocyanate or hexamethylene diisocyanate. In the disclosure, the diisocyanate is an aliphatic diisocyanate, so that synthesized polyurethane has excellent mechanical properties, light stability and chemical resistance and the like.

In the disclosure, based on the polymeric polyol in parts by weight, the raw materials for preparation of the non-ionic water based polyurethane include 0.3-0.6 parts, preferably 0.4-0.6 parts, more preferably 0.5 parts of antioxidant. In the disclosure, the antioxidant preferably includes hindered phenolic antioxidant and/or phosphite antioxidant. The disclosure adopts the above antioxidant which can prevent other raw materials from being oxidized, thereby improving antioxidation and mechanical properties and water resistance of the non-ionic water based polyurethane, and prolonging its service life.

In the disclosure, based on the polymeric polyol in parts by weight, the raw materials for preparation of the non-ionic water based polyurethane include 0.1-0.5 parts, more preferably 0.2-0.4 parts, more preferably 0.2-0.3 parts of organometallic catalyst. In the disclosure, the organometallic catalyst preferably includes at least one of organic silver catalyst, organic bismuth catalyst, and organic zinc catalyst. More preferably, the organometallic catalyst includes organic silver catalyst, organic bismuth catalyst, or organic zinc catalyst. In the disclosure, specific types and models of the organic silver catalyst, the organic bismuth catalyst and the organic zinc catalyst are not particularly limited, and commercially available products well known to those skilled in the art can be used, such as the catalyst ESCAT 100Ag-18KM (Korea Seho Company), AC-83 (American Vantrus Company) or Umicore 1910 (Dongguan Leading Environmental Material Co., Ltd.). The disclosure adopts the above organometallic catalyst which is environmentally friendly, safe, mild in catalytic activity, and also a very effective crosslinking promoter at a later stage, and can be used in a combination, thereby improving the water resistance, the mechanical properties and the compatibility of the non-ionic water based polyurethane.

In the disclosure, based on the polymeric polyol in parts by weight, the raw materials for preparation of the non-ionic water based polyurethane include 1-3 parts, preferably 38-48 parts, more preferably 35-45 parts, most preferably 40 parts of intramolecular crosslinking agent. In the disclosure, the intramolecular crosslinking agent preferably includes trimethylolpropane and/or trimethylolethane. More preferably, the intramolecular crosslinking agent includes trimethylolpropane or trimethylolethane. The disclosure adopts the intramolecular crosslinking agent with a high degree of crosslinking, which can ensure full crosslinking of the polymeric polyol and the diisocyanate, thereby improving the water resistance, the mechanical properties and the compatibility of the non-ionic water based polyurethane.

In the disclosure, based on the polymeric polyol in parts by weight, the raw materials for preparation of the non-ionic water based polyurethane include 4-6 parts, preferably 4.5-5.5 parts, more preferably 4.5-5 parts of silicone oil. In the disclosure, the silicone oil is preferably hydroxyl-containing silicone oil and/or amino-containing silicone oil. In the disclosure, the hydroxyl-containing silicone oil preferably has a hydroxyl content of 8-12 wt %, and the amino-containing silicone oil preferably has an amino content of 0.9-1.1%. In the disclosure, the silicone oil has many advantages such as low surface energy, excellent hydrophobicity and weather resistance. As a functional monomer, the silicone oil can introduce a hydrophilic segment and a water-resistant segment into a polyurethane molecule to improve the water resistance, the mechanical properties and the compatibility of the non-ionic water based polyurethane and extend its service life.

In the disclosure, based on the polymeric polyol in parts by weight, the raw materials for preparation of the non-ionic water based polyurethane include 2.1-5.5 parts, preferably 2.5-5 parts, more preferably 3-4.5 parts of auxiliary. The auxiliary includes a wetting agent, a leveling agent and a defoamer. In the disclosure, a mass ratio of the wetting agent, the leveling agent and the defoamer is preferably (1-3):(1-2):(0.1-0.5), more preferably (1.5-3):(1.2-2):(0.1-0.4), most preferably (1.5-2.5):(1.5-2):(0.2-0.3).

In the disclosure, the wetting agent includes preferably a silicone-based wetting agent and/or an alcohol-ether-based wetting agent. More preferably, the wetting agent includes a silicone-based wetting agent or an alcohol-ether-based wetting agent. In the disclosure, specific types and models of the silicone-based wetting agent and the alcohol-ether-based wetting agent are not particularly limited, and commercially available products well known to those skilled in the art can be used, for example, DOW OFX-5211 (Dow Corning Corporation, USA). In the disclosure, the wetting agent can promote wetting and leveling during the preparation of the non-ionic water based polyurethane, which facilitates improving rapid wetting of a substrate and leveling, thereby improving the water resistance, the mechanical properties, and the compatibility of the non-ionic water based polyurethane.

In the disclosure, the leveling agent is preferably silicone-based leveling agent. In the disclosure, specific types and models of the silicone-based leveling agent are not particularly limited, and commercially available products well known to those skilled in the art can be used, for example, TEGO 450 (German TEGO auxiliary). In the disclosure, the leveling agent can facilitate obtaining high compatibility, excellent recoatability, improved scratch resistance and pinhole prevention and the like during the preparation of the non-ionic water based polyurethane. Thereby, the leveling agent can facilitate improving formation of a smooth and compact film of the non-ionic water based polyurethane, so as to improve the water resistance, the mechanical properties and the compatibility of the non-ionic water based polyurethane.

In the disclosure, the defoamer preferably includes at least one of polysiloxane defoamer, mineral oil defoamer, and polyether defoamer. More preferably, the defoamer includes polysiloxane defoamer, mineral oil defoamer or polyether defoamer. In the disclosure, specific types and models of the polysiloxane defoamer, the mineral oil defoamer, and the polyether defoamer are not particularly limited, and commercially available products well known to those skilled in the art can be used, for example, TEGO Foamex 810 (German TEGO auxiliary) or ACP-1500 (Dow Corning Corporation, USA). In the disclosure, the defoamer can eliminate foams generated during production and application of the non-ionic water based polyurethane, thereby improving the water resistance, the mechanical properties, and the compatibility of the non-ionic water based polyurethane.

In the disclosure, based on the polymeric polyol in parts by weight, the raw materials for preparation of the non-ionic water based polyurethane include 1-2 parts, preferably 1.1-1.8 parts, more preferably 1.2-1.5 parts of chain extender. In the disclosure, the chain extender preferably includes at least one of ethylene diamine, hydroxyethyl ethylene diamine and isophorone diamine. More preferably, the chain extender includes ethylenediamine, hydroxyethyl ethylene diamine or isophorone diamine. In the disclosure, the above chain extenders can give a smaller particle size and a larger viscosity of the water based polyurethane emulsion, thereby improving the water resistance, the mechanical properties, and the compatibility of the non-ionic water based polyurethane.

In the disclosure, based on the polymeric polyol in parts by weight, the raw materials for preparation of the non-ionic water based polyurethane include 600-750 parts, preferably 620-400 parts, more preferably 650 parts of water. The disclosure has no special limitation on the water, and water well known in the art can be used, for example, deionized water or distilled water. In the disclosure, the viscosity of the non-ionic water based polyurethane can be adjusted with water, thereby improving the application workability of the non-ionic water based polyurethane during use. At the same time, the disclosure uses water as a solvent and no organic solvent is added, thus, the disclosure results in no secondary pollution, and ensures environmental protection.

The non-ionic water based polyurethane provided by the disclosure is obtained by the polymeric polyol and the diisocyanate as main components, the silicone oil as a functional monomer, the antioxidant, the wetting agent, the leveling agent and the defoamer in the presence of the intramolecular crosslinking agent, the organometallic catalyst, and the chain extender. The obtained non-ionic water based polyurethane has excellent water resistance.

The disclosure also provides a method for preparing the non-ionic water based polyurethane according to the above technical solution, including the following steps:

mixing the polymeric polyol, the antioxidant, the diisocyanate and the organometallic catalyst, and carrying out a first polymerization to obtain a first prepolymer;

mixing the first prepolymer and the intramolecular crosslinking agent, and carrying out a crosslinking reaction to obtain a second prepolymer;

mixing the second prepolymer and the silicone oil, and carrying out a second polymerization to obtain a third prepolymer; and mixing the third prepolymer, the auxiliary, the chain extender and the water, and carrying out a chain extension reaction to obtain the non-ionic water based polyurethane;

where the auxiliary includes a wetting agent, a leveling agent and a defoamer.

The disclosure is implemented by mixing the polymeric polyol, the antioxidant, the diisocyanate and the organometallic catalyst, and carrying out a first polymerization to obtain a first prepolymer.

In the disclosure, the mixing of the polymeric polyol, the antioxidant, the diisocyanate and the organometallic catalyst is preferably carried out in the following order: carrying out a first mixing with the polymeric polyol and the antioxidant, carrying out dehydration, adding the diisocyanate and the organometallic catalyst to an obtained system, and carrying out a second mixing. In the disclosure, the dehydration is carried out by preferably vacuum dehydration at preferably 75-85° C. for preferably 0.5-0.8 h at preferably –0.08 to –0.1 MPa. After the dehydration, the polymeric polyol has a water content of preferably ≤0.05%, and the antioxidant has a water content of preferably ≤0.1% to prevent water from affecting a reaction. In the disclosure, the second mixing is carried out at preferably 60-65° C. In the disclosure, the first mixing and the second mixing are carried out by preferably stirring. The disclosure has no special requirements on speed and time for the first mixing and the second mixing, as long as the raw materials are uniformly mixed.

In the disclosure, the first polymerization is carried out at preferably 60-75° C. and more preferably 65-75° C. for preferably 0.5-0.6 h.

After the first prepolymer is obtained, the disclosure is implemented by mixing the first prepolymer and the intramolecular crosslinking agent, and carrying out a crosslinking reaction to obtain a second prepolymer.

In the disclosure, the crosslinking reaction is carried out at preferably 75-85° C. for preferably 1.0-1.5 h. The crosslinking reaction can increase a molecular crosslinking density of the polyurethane, thereby improving the water resistance, the mechanical properties and the compatibility of the polyurethane.

After the second prepolymer is obtained, the disclosure is implemented by mixing the second prepolymer and the silicone oil, and carrying out a second polymerization to obtain a third prepolymer.

In the disclosure, the second polymerization is carried out at preferably 85-90° C. for preferably 1.5-2.0 h. During the second polymerization, the functional (i.e. water-resistant) monomer silicone oil is introduced to a polyurethane molecular chain to improve the water resistance of the non-ionic water based polyurethane.

In the disclosure, after the second polymerization is completed, it is preferable to determine that the NCO content in a reaction system reaches a theoretical value, and then reduce a temperature of the system to 55-60° C. before carrying out the subsequent chain extension reaction. In the disclosure, the NCO content is preferably determined with reference to HG-T 2409-1992 "Determination of Isocyanate Group Content in Polyurethane Prepolymer". In the disclosure, the theoretical value of the NCO content is preferably 1.8-2.5.

After the third prepolymer is obtained, the disclosure is implemented by mixing the third prepolymer, the auxiliary, the chain extender and the water, and carrying out a chain extension reaction to obtain the non-ionic water based polyurethane.

In the disclosure, the mixing of the third prepolymer, the auxiliary, the chain extender and the water is preferably carried out by performing a third mixing of the water and the auxiliary, adding the third prepolymer and the chain extender to an obtained auxiliary solution, and performing a fourth mixing. In the disclosure, the third mixing and the fourth mixing are carried out independently at preferably ≤12° C., more preferably 10-12° C.

In the disclosure, the chain extension reaction is carried out at preferably 10-20° C. and more preferably 10-15° C. for preferably 0.5-1.0 h and more preferably 0.6-0.8 h. In the disclosure, during the chain extension reaction, the chain extender reacts with the isocyanate to form a urea group with high cohesive energy, which can provide the polyurethane with excellent physical and mechanical properties, improving the water resistance, the mechanical properties and the compatibility of the non-ionic water based polyurethane.

In the disclosure, the third mixing, the fourth mixing and the chain extension reaction are preferably carried out in a dispersion kettle.

The preparation method provided by the disclosure has simple operations and is suitable for industrial production. A hydrophilic chain segment of the hydrophilic polyether diol is introduced into the molecule, and at the same time, the silicone oil is introduced as a reaction monomer for water resistance, so as to synthesize the non-ionic water based polyurethane with excellent water resistance, mechanical properties and compatibility by self-emulsification. Moreover, no organic solvent is added during preparation, thus, the disclosure results in no secondary pollution, and ensures environmental protection.

The disclosure also provides use of the non-ionic water based polyurethane of the above technical solution or a non-ionic water based polyurethane prepared by the method of the above technical solution in leather finishing agent, glass fiber and textile auxiliary.

The disclosure is further described below with reference to the accompanying drawings and examples.

EXAMPLE 1

Based on parts by weight, 80 kg of polyoxypropylene glycol with a molecular weight of 2,000, 15 kg of polycaprolactone glycol with a molecular weight of 2,000, 40 kg of hydrophilic polyether diol and 0.5 kg of antioxidant 1010 were added into a reactor. A temperature was raised to 75° C. under stirring, and a vacuum was created at –0.08 MPa for 0.8 h, so that a water content of a resulted mixture was <0.05%. A system was heated to 60° C. 35 kg of isophorone diisocyanate and 0.2 kg of organic zinc catalyst Umicore 1910 was added. Reaction was carried out at 65° C. for 0.6 h to obtain a first prepolymer.

Reaction of the first prepolymer and 0.9 kg trimethylolpropane (that is, an intramolecular crosslinking agent accounted for 0.5% of total mass of raw materials excluding deionized water) was carried out at 75° C. for 1.5 h. A temperature was raised to 85° C., and then 4.8 kg of hydroxyl-containing silicone oil was added. Reaction was carried out for 2.0 h. With reference to HG-T 2409-1992 "Determination of Isocyanate Group Content in Polyurethane Prepolymer", an NCO content in the system was determined to reach 1.8-2.0. Then, the temperature was reduced to 55° C. to obtain a second prepolymer.

650 kg of deionized water was added to a dispersion kettle, cooled to 10° C., added with 1.5 kg of silicone wetting agent OFX-5211, 2 kg of silicone leveling agent TEGO 450 and 0.2 kg of silicone defoamer WA-560, and mixed uniformly. The second prepolymer was added to an obtained system and mixed uniformly. Then 1.0 kg of isophorone diamine was added dropwise. Reaction was carried out for 1.0 h to obtain a non-ionic water based polyurethane.

EXAMPLE 2

A non-ionic water based polyurethane was prepared according to the method of Example 1. A difference from Example 1 was that 1.8 kg of trimethylolpropane was used, that is, the intramolecular crosslinking agent accounted for 1.0% of the total mass of the raw materials excluding the deionized water.

EXAMPLE 3

A non-ionic waterborne polyurethane was prepared according to the method of Example 1. A difference from Example 1 was that 2.7 kg of trimethylolpropane was used, that is, the intramolecular crosslinking agent accounted for 1.5% of the total mass of the raw materials excluding the deionized water.

EXAMPLE 4

Based on parts by weight, 85 kg of polyoxypropylene glycol with a molecular weight of 2,000, 25 kg of polycaprolactone glycol with a molecular weight of 2,000, 38 kg of non-ionic diol and 0.5 kg of antioxidant 1010 were added into a reactor. A temperature was raised to 85° C. under stirring, and a vacuum was created at −0.1 MPa for 0.7 h, so that a water content of polymeric polyols was <0.05%. A system was heated to 65° C. 40 kg of isophorone diisocyanate and 0.2 kg of organic bismuth catalyst AC-83 was added. Reaction was carried out at 75° C. for 0.5 h to obtain a first prepolymer.

Reaction of the first prepolymer and 1.5 kg of trimethylolpropane was carried out at 85° C. for 1.0 h. A temperature was raised to 90° C., then 2.4 kg of hydroxyl-containing silicone oil was added (that is, the hydroxyl-containing silicone oil accounted for 1.2% of total mass of raw materials excluding deionized water). Reaction was carried out for 1.5 h. With reference to HG-T 2409-1992 "Determination of Isocyanate Group Content in Polyurethane Prepolymer", an NCO content in the system was determined to reach 2.2-2.5. Then, the temperature was reduced to 60° C. to obtain a second prepolymer.

650 kg of deionized water was added to a dispersion kettle, cooled to 8° C., added with 1.5 kg of silicone wetting agent OFX-5211, 2 kg of silicone leveling agent TEGO 450 and 0.2 kg of silicone defoamer WA-560, and mixed uniformly. The second prepolymer was added to an obtained system and mixed uniformly. Then 1.2 kg of ethylenediamine was added dropwise. Reaction was carried out for 0.8 h to obtain a non-ionic water based polyurethane.

EXAMPLE 5

A non-ionic water based polyurethane was prepared according to the method of Example 2. A difference from Example 2 was that 4.8 kg of hydroxyl-containing silicone oil was used, that is, the hydroxyl-containing silicone oil accounted for 2.4% of the total mass of the raw materials excluding the deionized water.

EXAMPLE 6

A non-ionic water based polyurethane was prepared according to the method of Example 2. A difference from Example 2 was that 7.2 kg of hydroxyl-containing silicone oil was used, that is, the hydroxyl-containing silicone oil accounted for 3.6% of the total mass of the raw materials excluding the deionized water, an amount controlled within an appropriate range.

COMPARATIVE EXAMPLE 1

A non-ionic water based polyurethane was prepared according to the method of Example 1. A difference from Example 1 was that no trimethylolpropane was added.

COMPARATIVE EXAMPLE 2

A non-ionic water based polyurethane was prepared according to the method of Example 2. A difference from Example 2 was that no hydroxyl-containing silicone oil was added.

TEST EXAMPLE 1

The non-ionic water based polyurethane emulsions prepared in Examples 1-6 and Comparative Examples 1-2 were tested respectively for particle size and viscosity of emulsion, and the test results were shown in Tables 1-2.

10 g of the non-ionic water based polyurethane emulsions prepared in Examples 1-6 and Comparative Examples 1-2 were respectively and accurately weighed and placed in a φ9 cm watch glass to form a uniform film on the bottom of the glass. Drying was carried out in a drying oven at 72° C. for 12 h. The glass was taken out and cooled to room temperature. The film was carefully peeled off to obtain a non-ionic water based polyurethane film. The obtained non-ionic water based polyurethane film was cut into a 2 cm×2 cm sample and weighed as $g_1$. The film was soaked in deionized water at room temperature for 24 h, and taken out. Water on a surface was quickly absorbed. The film was weighed as $g_2$. A calculation formula for absorption rate of the non-ionic water based polyurethane film was: $x(\%)=(g_2-g_1)/g_1 \times 100\%$. Test results were shown in Tables 1-2.

TABLE 1

Effect of intramolecular crosslinking agent on non-ionic water based polyurethane

| Item | Example 1 | Example 2 | Example 3 | Comparative Example 1 |
|---|---|---|---|---|
| Mass fraction of intramolecular crosslinking agent/% | 0.5 | 1.0 | 1.5 | 0 |
| Appearance of emulsion | Milky white with blue light | Milky white with blue light | Milky white with blue light | Milky white with blue light |
| Particle size of emulsion/nm | 920 | 1020 | 1180 | 700 |
| Viscosity of emulsion/mpa · s | 76 | 88 | 110 | 55 |
| Water absorption rate/% | 26 | 22 | 15 | 35 |

In Table 1, the mass fraction of intramolecular crosslinking agent represented the percentage of the mass of the intramolecular crosslinking agent in the total mass of all raw materials excluding water. It can be seen from Table 1 that, within a certain range, the particle size and the viscosity of the emulsion increased with the increasing amount of the intramolecular crosslinking agent, while the water absorption rate decreased with the increasing amount of the intramolecular crosslinking agent. This indicated that, the non-ionic water based polyurethane provided by the disclosure had excellent water resistance.

TABLE 2

Effect of hydroxyl-containing silicone oil on non-ionic water based polyurethane

| Item | Example 4 | Example 5 | Example 6 | Comparative Example 2 |
|---|---|---|---|---|
| Mass fraction of hydroxyl-containing silicone oil/% | 1.2 | 2.4 | 3.6 | 0 |
| Appearance of emulsion | Milky white with blue light | Milky white with blue light | Milky white with blue light | Milky white with blue light |
| Particle size of emulsion/nm | 970 | 1210 | 1320 | 700 |
| Viscosity of emulsion/mpa · s | 110 | 190 | 300 | 55 |
| Water absorption rate/% | 22 | 16 | 11 | 35 |

In Table 2, the mass fraction of hydroxyl-containing silicone oil represented the percentage of the mass of the hydroxyl-containing silicone oil in the total mass of all raw materials excluding water. It can be seen from Table 2 that, within a certain range, the particle size and the viscosity of the emulsion increased with the increasing amount of the hydroxyl-containing silicone oil, while the water absorption rate decreased with the increasing amount of the hydroxyl-containing silicone oil. This indicated that, the non-ionic water based polyurethane provided by the disclosure had excellent water resistance.

TEST EXAMPLE 2

Test of Mechanical Properties

A sample film was vacuum dried in an oven for 24 h, and then made into a dumbbell-shaped sample strip with a mold. The prepared sample strip was placed in an oven for half an hour to eliminate stress generated during pressing of the sample. A CMT6014 electronic universal (tensile) testing machine was used for testing. A general rubber tensile mode was used to determine mechanical properties at room temperature and a rate of 100 mm/min.

TABLE 3

Effect of intramolecular crosslinking agent on mechanical properties of non-ionic water based polyurethane

| Item | Example 1 | Example 2 | Example 3 | Comparative Example 1 |
|---|---|---|---|---|
| Mass fraction of intramolecular crosslinking agent/% | 0.5 | 1.0 | 1.5 | 0 |
| Tensile strength (Mpa) | 9.46 | 13.65 | 20.66 | 6.35 |
| Elongation at break (%) | 469 | 399 | 352 | 602 |

Table 3 showed effect of intramolecular crosslinking agent on mechanical properties of the polyurethane film. It can be seen from Table 3 that, as proportion of the intramolecular crosslinking agent increased, the tensile strength of the film increased, while the elongation at break decreased gradually.

TABLE 4

Effect of hydroxyl-containing silicone oil on mechanical properties of non-ionic water based polyurethane

| Item | Example 4 | Example 5 | Example 6 | Comparative Example 2 |
|---|---|---|---|---|
| Mass fraction of hydroxyl-containing silicone oil/% | 1.2 | 2.4 | 3.6 | 0 |
| Tensile strength (Mpa) | 5.88 | 5.23 | 4.25 | 6.35 |
| Elongation at break (%) | 658 | 725 | 812 | 602 |

Table 4 showed effect of hydroxyl-containing silicone oil on mechanical properties of the non-ionic water based polyurethane. It can be seen from Table 4 that, as amount of the hydroxyl-containing silicone oil increased, the tensile strength of the film decreased, while the elongation at break increased gradually.

The above description of the examples is intended to help understand the method and core idea of the disclosure only. It should be noted that, several improvements and modifications may be made by persons of ordinary skill in the art without departing from the principle of the disclosure, and these improvements and modifications should also be considered within the protection scope of the disclosure. Various modifications to these examples are readily apparent to persons skilled in the art, and the generic principles defined herein may be practiced in other examples without departing from the spirit or scope of the disclosure. Thus, the disclosure is not limited to the examples shown herein but falls within the widest scope consistent with the principles and novel features disclosed herein.

What is claimed is:

1. A method for preparing a non-ionic water based polyurethane, the non-ionic water based polyurethane being prepared from the following components in parts by weight:
   120-185 parts of a polymeric polyol,
   30-40 parts of a diisocyanate,
   0.3-0.6 parts of an antioxidant,
   0.1-0.5 parts of an organometallic catalyst,
   1-3 parts of an intramolecular crosslinking agent,
   4-6 parts of a silicone oil,
   2.1-5.5 parts of an auxiliary,
   1-2 parts of a chain extender, and
   600-750 parts of water,
   wherein the polymeric polyol comprises a polyether diol and a polyester diol, and
   the auxiliary comprises a wetting agent, a leveling agent and a defoamer; and
   the method comprising the following steps:
   mixing the polymeric polyol, the antioxidant, the diisocyanate and the organometallic catalyst, and carrying out a first polymerization to obtain a first prepolymer;
   mixing the first prepolymer and the intramolecular crosslinking agent, and carrying out a crosslinking reaction to obtain a second prepolymer;
   mixing the second prepolymer and the silicone oil, and carrying out a second polymerization to obtain a third prepolymer; and
   mixing the third prepolymer, the auxiliary, the chain extender and the water, and carrying out a chain extension reaction to obtain the non-ionic water based polyurethane.

2. The method according to claim 1, wherein the polyether diol comprises at least two of polyethylene glycol, polyoxypropylene glycol, polytetrahydrofuran ether glycol, ethylene oxide polyether, non-ionic polyether diol, linear polyethylene glycol bifunctional methyl ether and polyethylene glycol monomethyl ether; and the polyester diol comprises at least one of carbonate diol, polycaprolactone diol and polybutylene adipate.

3. The method according to claim 1, wherein a mass ratio of the polyether diol to the polyester diol is (110-155):(10-30).

4. The method according to claim 2, wherein a mass ratio of the polyether diol to the polyester diol is (110-155):(10-30).

5. The method according to claim 1, wherein the diisocyanate comprises at least one of isophorone diisocyanate, hydrogenated phenylmethane diisocyanate and hexamethylene diisocyanate.

6. The method according to claim 1, wherein the silicone oil comprises hydroxyl-containing silicone oil and/or amino-containing silicone oil.

7. The method according to claim 1, wherein the antioxidant comprises hindered phenolic antioxidant and/or phosphite antioxidant;

the organometallic catalyst comprises at least one of organic silver catalyst, organic bismuth catalyst, and organic zinc catalyst;

the intramolecular crosslinking agent comprises trimethylolpropane and/or trimethylolethane; and the chain extender comprises at least one of ethylene diamine, hydroxyethyl ethylene diamine and isophorone diamine.

8. The method according to claim 1, wherein a mass ratio of the wetting agent, the leveling agent and the defoamer is (1-3):(1-2):(0.1-0.5).

9. The method according to claim 1, wherein the first polymerization is carried out at 60-75° C. for 0.5-0.6 h;
the crosslinking reaction is carried out at 75-85° C. for 1.0-1.5 h;
the second polymerization is carried out at 85-90° C. for 1.5-2.0 h; and
the chain extension reaction is carried out at 10-20° C. for 0.5-1.0 h.

10. The method according to claim 2, wherein the first polymerization is carried out at 60-75° C. for 0.5-0.6 h;
the crosslinking reaction is carried out at 75-85° C. for 1.0-1.5 h;
the second polymerization is carried out at 85-90° C. for 1.5-2.0 h; and
the chain extension reaction is carried out at 10-20° C. for 0.5-1.0 h.

11. The method according to claim 3, wherein the first polymerization is carried out at 60-75° C. for 0.5-0.6 h;
the crosslinking reaction is carried out at 75-85° C. for 1.0-1.5 h;
the second polymerization is carried out at 85-90° C. for 1.5-2.0 h; and
the chain extension reaction is carried out at 10-20° C. for 0.5-1.0 h.

12. The method according to claim 4, wherein the first polymerization is carried out at 60-75° C. for 0.5-0.6 h;
the crosslinking reaction is carried out at 75-85° C. for 1.0-1.5 h;
the second polymerization is carried out at 85-90° C. for 1.5-2.0 h; and
the chain extension reaction is carried out at 10-20° C. for 0.5-1.0 h.

* * * * *